US008603834B2

(12) United States Patent
Puleo et al.

(10) Patent No.: US 8,603,834 B2
(45) Date of Patent: Dec. 10, 2013

(54) ACTUATION OF VALVES USING ELECTROOSMOTIC PUMP

(75) Inventors: Christopher Michael Puleo, Glenville, NY (US); Christopher Fred Keimel, Schenectady, NY (US); Craig Patrick Galligan, Cropseyville, NY (US)

(73) Assignee: General Electric Company, Niskayuna, NY (US)

( * ) Notice: Subject to any disclaimer, the term of this patent is extended or adjusted under 35 U.S.C. 154(b) by 136 days.

(21) Appl. No.: 13/357,729

(22) Filed: Jan. 25, 2012

(65) Prior Publication Data

US 2013/0153797 A1 Jun. 20, 2013

Related U.S. Application Data

(63) Continuation-in-part of application No. 13/326,653, filed on Dec. 15, 2011.

(51) Int. Cl.
*G01N 1/10* (2006.01)
(52) U.S. Cl.
USPC .............. 436/180; 422/50; 422/500; 422/501; 422/502; 422/503; 251/12
(58) Field of Classification Search
USPC ................ 436/180; 422/50, 500–503; 251/12
See application file for complete search history.

(56) References Cited

U.S. PATENT DOCUMENTS

| 4,673,483 | A | 6/1987 | Mandle |
|---|---|---|---|
| 6,277,257 | B1 | 8/2001 | Paul et al. |
| 6,406,605 | B1 | 6/2002 | Moles |
| 7,101,467 | B2 | 9/2006 | Spaid |
| 7,695,603 | B2 | 4/2010 | Paul et al. |
| 7,727,363 | B2 | 6/2010 | Jacobson et al. |
| 7,867,592 | B2 | 1/2011 | Nelson et al. |
| 2003/0085024 | A1 | 5/2003 | Santiago et al. |
| 2003/0143081 | A1 | 7/2003 | Rakestraw et al. |
| 2004/0208751 | A1 | 10/2004 | Lazar et al. |
| 2004/0241004 | A1 | 12/2004 | Goodson et al. |
| 2005/0133371 | A1 | 6/2005 | Timperman |
| 2006/0108286 | A1 | 5/2006 | Hambitzer et al. |
| 2008/0210559 | A1 | 9/2008 | Chen et al. |
| 2010/0003666 | A1 | 1/2010 | Lee et al. |

OTHER PUBLICATIONS

Search Report and Written Opinion from corresponding PCT Application No. PCT/EP2012/075469 dated Apr. 15, 2013.
Carlos et al., "Large-Scale Integration of Solid-State Microfluidic Valves with no Moving Parts", University of Michigan, pp. 1-183, Jan. 2005.
Lulia et al., "Multiple Open-Channel Electroosmotic Pumping System for Microfluidic Sample Handling", ACS Publications, pp. 1-10, Nov. 5, 2002.
Brask et al., "Electroosmotic Micropumps", Department of Micro and Nanotechnology Technical University of Denmark, pp. 1-151, Aug. 31, 2005.

*Primary Examiner* — Jyoti Nagpaul
(74) *Attorney, Agent, or Firm* — Jennifer Haeckl

(57) ABSTRACT

A method of actuating a valve, comprises operatively coupling the valve with an electroosmotic pump; flowing a fluid through the electroosmotic pump; and generating a fluidic pressure of at least 0.75 PSI to actuate the valve, wherein the electroosmotic pump comprises one or more thin, porous, positive electroosmotic membranes and one or more thin porous, negative electroosmotic membranes; a plurality of electrodes comprising cathodes and anodes, and a power source; wherein each of the positive and negative electroosmotic membranes are disposed alternatively and wherein at least one of the cathodes is disposed on one side of one of the membranes and at least one of the anodes is disposed on the other side of the membrane and wherein at least one of the cathodes or anodes is disposed between a positive and a negative electroosmotic membrane.

18 Claims, 12 Drawing Sheets

ACTUATION OF VALVES USING ELECTROOSMOTIC PUMP

CROSS REFERENCE TO RELATED APPLICATIONS

This application is a continuation-in-part of U.S. patent application Ser. No. 13/326,653, entitled "Electroosmotic pump and method of use thereof", filed Dec. 15, 2011; which is herein incorporated by reference.

STATEMENT REGARDING FEDERALLY SPONSORED RESEARCH & DEVELOPMENT

This invention was made with Government support under contract number HDTRA1-10-C-0033 awarded by the Defense Threat Reduction Agency. The Government has certain rights in the invention.

FIELD

The invention relates to a non-mechanical pump, and more particularly to an electroosmotic pump (EOP) that generates high pressure using comparatively lower voltage. The invention is further associated with the use of the high pressure EOPs for self-contained actuation of mechanical valves and control components.

BACKGROUND

Pumps can be classified into mechanical and non-mechanical varieties. Generally, the conventional mechanical pumps have issues with reliability of the moving pump-components. Electrokinetic pumps, on the other hand, contain no moving parts, making them suitable for a variety of applications, including fluid movement in microanalytical systems. Electroosmotic pumps (EOPs) are one of the most represented class of these pumps, and provide fluid flow due to movement of an electric double layer that forms at the solid-liquid interface. Application of an electric field across a porous membrane structure of an EOP results in a movement of the electric double layer, which results in viscous drag. The viscous drag then causes bulk fluid flow and generation of a net pressure.

Standard EOPs made from a ceramic frit or packed capillaries require over 1 kV to establish the electric fields required for pumping. The EOPs produce fluid pressure capable of valve actuation, but yield no benefits in terms of voltage requirements or overall size. Alternative thin porous substrates have, so far, produced the highest pumping pressures per applied voltage due to high surface-to-volume ratios. A small pore length across a thin porous substrate enables the development of high electric field strength across each pore, thus increasing the pumping efficiency. However, such single membrane pumps have pressure and flow limitations, such that application of a few volts generate pumping pressure of less than 1 PSI; thus, utilization as an actuating power source remains impractical.

To increase the pumping pressure of low-voltage EOPs and thus enable self-contained valve actuation, increased surface area for electric double layer formation is required, and hence increased thickness of the substrate (for example, membrane). However, there is no current solution for an arrangement of membranes and electrodes in an EOP, such that the high pressure may be accomplished at low running voltages without changing the electric field strength across the individual pores. In addition, standard methods (e.g. hydrolyzing metal electrodes) of generating ionic currents within the EOPs have detrimental effects on the pump operation, due to the release of gas during pumping.

The low pressure constraint remains a limiting factor for practical utility of low-voltage EOPs. Still, the need for self-containment in analytical, biomedical, pharmaceutical, environmental, and security monitoring applications remains a great challenge, and battery-driven EOPs may serve to replace the limiting control equipment required to run devices, such as high voltage power or pressure supplies.

Maintaining high electric field strength, while using low running voltages are two conflicting requirements, which are difficult to accomplish through conventional EOPs. Therefore, the EOPs which are capable of generating high pressure using a lower applied voltage that maintain membrane fabrication requirements are desirable. Moreover, the simplicity of the EOP processing also makes EOPs a candidate pressure source for actuation of valves within fluidic systems. However, pressure limitations associated with current low-voltage EOPs makes this practically challenging. Still, the ability to package each valve with its own actuator and power source may solve many current problems associated with miniaturization of standard lab-scale control equipment.

BRIEF DESCRIPTION

Accurately controlled electrode spacing within a thick and dense network of pores may be a solution for maintaining high electric field strength at low running voltages. The EOPs, described herein, comprising a plurality of membranes and electrodes may solve the above mentioned problem and generate a high pressure even at a lower applied voltage using a simple fabrication technique.

One example of a method of actuating a valve, comprises operatively coupling the valve with an electroosmotic pump; flowing a fluid through the electroosmotic pump; and generating a fluidic pressure of at least 0.75 PSI to actuate the valve, wherein the electroosmotic pump comprises one or more thin, porous, positive electroosmotic membranes and one or more thin porous, negative electroosmotic membranes; a plurality of electrodes comprising cathodes and anodes, and a power source; wherein each of the positive and negative electroosmotic membranes are disposed alternatively and wherein at least one of the cathodes is disposed on one side of one of the membranes and at least one of the anodes is disposed on the other side of the membrane and wherein at least one of the cathodes or anodes is disposed between a positive and a negative electroosmotic membrane.

An embodiment of a microfluidic device, comprises one or more valves; and one or more electroosmotic pumps, wherein the electroosmotic pumps comprise both positive and negative electroosmotic membranes; a plurality of electrodes comprising cathodes and anodes, and a power source; wherein each of the positive electroosmotic membranes and negative electroosmotic membranes are disposed alternatively and wherein at least one of the cathodes is disposed on one side of one of the membranes and at least one of the anodes is disposed on other side of the membrane and wherein at least one of the cathodes or anodes is disposed between a positive electroosmotic membrane and negative electroosmotic membrane; wherein one or more of the valves are operatively coupled to one or more of the electroosmotic pumps.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
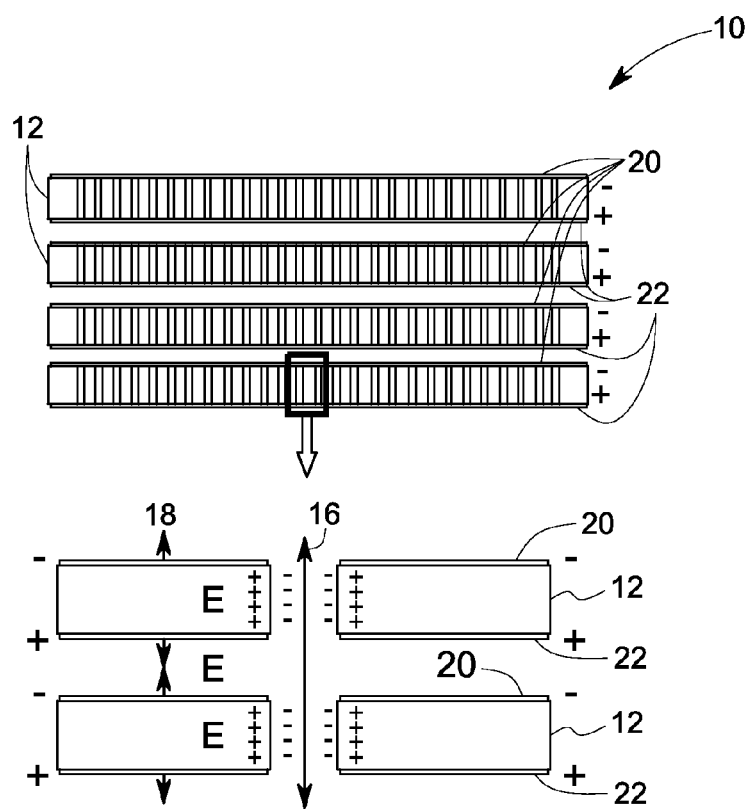
FIG. 1A is a schematic drawing of an example of an EOP with multiple membranes having the same surface charge and FIG. 1B is a schematic drawing of an example of an EOP with multiple membranes having alternating (+/−) surface charge.

One or more of the embodiments of the invention relate to an electroosmotic pump (EOP), wherein the EOP generates high pressure using lower applied voltage. High pressure, yet low voltage EOPs may solve the problem of self-contained fluidic systems, where the self-containment refers to the elimination of power, pressure, and input sources external to the device. In addition to fluid movement within the systems, the high pressure EOPs may be operatively coupled to mechanical valves, and used as portable actuation or pressure sources.

To more clearly and concisely describe the subject matter of the claimed invention, the following definitions are provided for specific terms, which are used in the following description and the appended claims. Throughout the specification, exemplification of specific terms should be considered as non-limiting examples.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Where necessary, ranges have been supplied, and those ranges are inclusive of all sub-ranges there between.

As used herein, the term "electroosmotic membranes" refers to the membranes which are capable of maintaining electroosmotic flow of a fluid using electroosmosis. Electroosmosis is a motion of a fluid containing charged species relative to a stationary charged medium by an application of an externally applied electric field. Electroosmotic flows are useful in microfluidic systems as the flow enables fluid pumping and control of the flow-rate without using mechanical pumps or valves.

As used herein, the term "positive electroosmotic membrane" refers to a porous membrane with surface properties, such that induced electroosmotic flow occurs in the direction of the applied electric field in deionized water. It is known to those skilled in the art that the magnitude and direction of electroosmotic flow is dependent on the operating parameters, including the type of running liquid or buffer system used.

As used herein, the term "negative electroosmotic membrane" refers to a porous membrane with surface properties, such that induced electroosmotic flow occurs in the direction opposing the applied electric field in deionized water. It is known to those skilled in the art that the magnitude and direction of electroosmotic flow is dependent on the operating parameters, including the type of running liquid or buffer system used.

As used herein, the term "porous material" refers to a material with a plurality of pores, wherein the material is macroporous, microporous, or nanoporous. The porous material may form "porous membrane" and "porous electrodes". The pores can be macropores, micropores or nanopores. In case of micropores, the average pore size may be, for example, less than about 10 microns, or less than about 5 microns, or less than about one micron. In the case of nanopores, the average pore size may be, for example, about 200 nm to about 10 microns, or about 200 nm to about 5 microns, or about 200 nm to about 3 microns. The porous membranes may be made of inorganic materials such as, silicon, alumina, silicon nitride, or silicon dioxide. The porous electrodes may be made of metals such as, platinum (Pt) or gold (Au), or redox materials, such as metal salts or conductive polymers.

As used herein, the term "interspersed" or "intervening" refers to a position of a membrane or an electrode which is present between two other electrodes or two other membranes respectively. For example, a membrane is interspersed means the membrane is disposed between two different electrodes, wherein the electrodes are oppositely charged. In another example, an electrode is intervened or interspersed means the electrode is disposed between two membranes with opposite surface charge. The term "disposed between" is alternatively used herein as "interspersed" or "intervened".

As used herein, the term "operatively coupled" refers to a functional interaction between one or more components. For example, one or more valves may be operatively coupled to an EOP, and actuation of the valve may be controlled by controlling the EOP by changing the number of membranes, electrode materials, membrane materials or applied voltage. Multiple functions of the valve may be controlled by the EOP control unit, and may be included within the definition of operatively coupled.

As used herein, the term "transverse direction" refers to the movement of fluid across an EOP structure in a direction that is parallel to the electric field. In an EOP structure, the movement of fluid is from one side of the membrane to the other.

One or more examples of a method of actuating a valve comprises operatively coupling of the valve with an EOP, flowing a fluid through the EOP, and generating a fluidic pressure of at least 0.75 PSI to actuate the valve. In this example of the method, the EOP comprises one or more thin, porous, positive electroosmotic membranes and one or more thin porous, negative electroosmotic membranes; a plurality of electrodes comprising cathodes and anodes, and a power source. The electroosmotic membranes comprise one or more positive electroosmotic membranes and one or more negative electroosmotic membranes. Each of the positive electroosmotic membranes and negative electroosmotic membranes are disposed alternatively. In one embodiment, at least one of the cathodes is disposed on one side of one of the electroosmotic membranes and at least one of the anodes is disposed on the directionally opposite side of the electroosmotic membrane, and at least one of the cathodes or anodes is disposed between a positive electroosmotic membrane and a negative electroosmotic membrane.

The EOP is fabricated with multiple porous electroosmotic membranes and electrodes in a layer-by-layer structure, wherein alternatively charged membranes are stacked or fabricated one after another. The electrodes are disposed on both sides of each of the membranes forming intervening layers between the stacked membranes. For example, Pt is sputtered on the surface of the porous membrane, wherein the porous membrane is anodic aluminum oxide or AAO.

In one embodiment, a simplified structure of EOP, which is alternatively referred to herein as "unit structure of EOP" or "unit of EOP", comprises at least two electroosmotic membranes and at least three electrodes along with a power source, wherein the electroosmotic membranes comprise one positive electroosmotic membrane and one negative electroosmotic membrane and the electrodes comprise at least two cathodes and one anode or at least two anodes and one cathode.

Each of the electroosmotic membranes has a cathode and an anode associated with it, and each EOP unit within the stack is electrically isolated from the next. This enables dense stacking of the nanoporous electroosmotic membranes, without changing the electric field strength across individual pores. For example, each of the anodes is disposed on one side of the electroosmotic membrane and each of the cathodes is disposed on the other side of the membrane, thus every other electrode is attached to the same terminal on the battery/power source.

In one exemplary embodiment, a cathode is disposed on a negative electroosmotic membrane and an anode is disposed on the other side of the negative electroosmotic membrane, which results in the negative electroosmotic membrane to intersperse between the cathode and anode. In another exemplary embodiment, an anode is disposed on (upstream of) a positive electroosmotic membrane and a cathode is disposed on other side (downstream) of the positive electroosmotic membrane, such that the positive electroosmotic membrane is interspersed between the anode and cathode.

Various arrangements or rearrangements of the membranes and electrodes are possible, while maintaining alternatively charged membranes stacked with two oppositely charged electrodes on both sides of each of the membranes and keeping one electrode common between each of the two membranes. In one embodiment, in each of the EOPs, only one of the cathodes or anodes is disposed between two oppositely charged electroosmotic membranes, such as, in one exemplary configuration, the unit structure of EOP has one anode which is common between a positive electroosmotic membrane and negative electroosmotic membrane, and that results in a sequential disposition of a cathode, a positive electroosmotic membrane, an anode, a negative electroosmotic membrane, and then again another cathode. In another exemplary configuration, the unit EOP structure has one cathode which is common between the positive electroosmotic membrane and negative electroosmotic membrane, which results in a sequential disposition of an anode, a positive electroosmotic membrane, a cathode, a negative electroosmotic membrane, and then again, another anode.

In some exemplary embodiments, multiple units of EOPs are stacked together, wherein the multiple electroosmotic membranes and electrodes are arranged in a layer-by-layer structure. Each of these layers remains electrically insulated due to the alternating anode/cathode arrangement, without physical insulation of the electrode material itself. In one example, a first unit of an EOP is followed by a second unit of an EOP, wherein the second unit of the EOP comprises a negative electroosmotic membrane that is disposed either upstream or downstream of the positive electroosmotic membrane of the first unit of the EOP. For example, in one embodiment, the negative electroosmotic membrane of the second unit of the EOP is disposed downstream of an anode of the first unit of the EOP, and a cathode is disposed on the directionally opposite side of the negative electroosmotic membrane, such that the membrane is interspersed between the anode and cathode. The interspersed negative electroosmotic membrane is further followed by a positive electroosmotic membrane, which is disposed downstream of the cathode, and an anode is further disposed on the directionally opposite side of the positive electroosmotic membrane to form the second unit of the EOP that is situated downstream of the first unit of the EOP. In some other embodiments, a third unit of an EOP is further formed downstream of the second unit of the EOP, a fourth unit of an EOP is further formed downstream of the third unit of the EOP, and so on. Hence, by stacking the multiple units of the EOPs, a single "integrated EOP" is generated, wherein the integrated EOP comprises multiple membranes and electrodes and the electrodes are present as intervening layers between each of the membranes. The multiple units of the EOPs provide increasing pump surface area to the single integrated EOP, which generates higher pumping pressure without using complicated fabrication or higher input voltage. The stacking architecture thus enables high pressure pumping at low voltages, resembling a single unit of an EOP.

Multiple low-voltage, high pressure EOPs may be used together in a series or in parallel. The EOPs may also be integrated within micro-meter and millimeter scale fluidic systems, by, for example, stacking them together to increase the pressure output or to maintain flow rate to overcome the viscous losses and pressure loads in long channels. The devices described herein may be run on small batteries, and can thus enable a variety of hand held devices. The high pressure EOPs may also be operatively coupled to mechanical control structures, such as valves, and provide pressure output or the forces necessary for actuation in a self-contained manner.

An alternative attempt for a method of stacking multiple units of the EOP's to increase a pumping pressure in portable fluidic systems is illustrated in FIG. 1A, wherein each of the membranes is an AAO with Pt sputtered on both of the surfaces. As illustrated in FIG. 1A, multiple membrane stacking arrangement 10 shows each of the membranes 12 is with the same surface charge, for example, either alumina membrane or silica membrane. Each of the membranes 12 is interspersed between two oppositely charged electrodes, such as cathode 20 and anode 22. Each of the membranes is a porous membrane and the electrodes are also porous electrodes, which form channels 14 through the membrane stack. In this configuration, stacking multiple low-voltage units of the EOPs of similar zeta potential results in an electric field interference 18 and bidirectional electroosmotic flow 16, as each of the AAO needs to be electrically insulated with fluidic continuity with the next EOP.

Figure 1B:
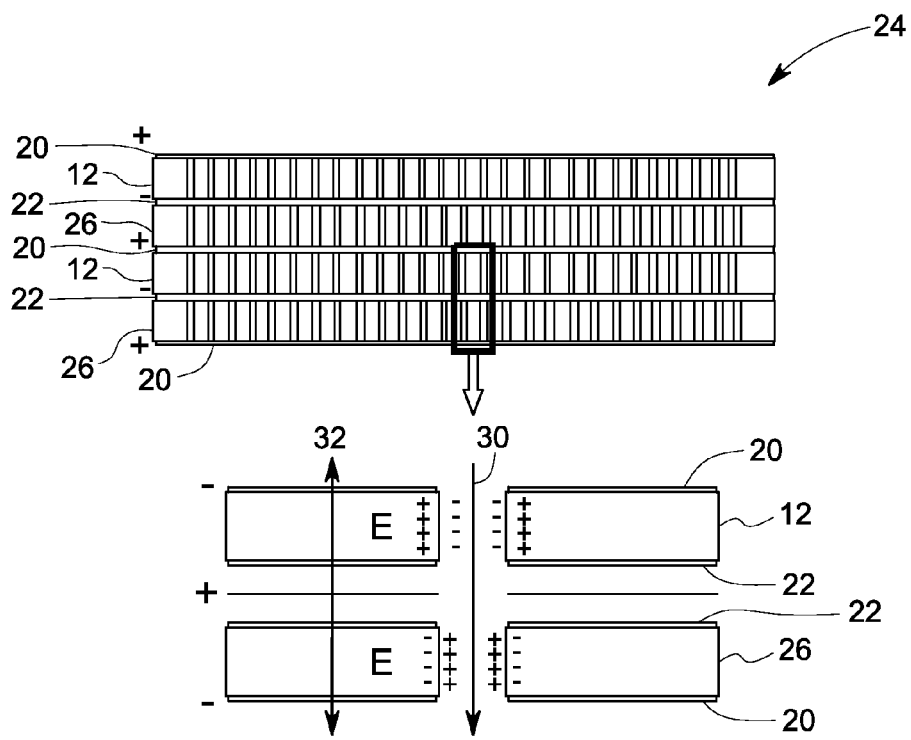

This complication is eliminated by developing an arrangement of a low-voltage high-pressure EOP 24 of FIG. 1B. The EOP of this embodiment as illustrated in FIG. 1B, utilizes alternating nanoporous membranes 12 and 26 with opposing zeta potentials. Each of the membranes is interspersed between two oppositely charged electrodes, such as cathode 20 and anode 22. For membrane stacked EOP, the intervening electrode layers are common, such as for first and second membranes 12 and 26, the intervening electrode is 22, for second and third membranes 26 and 12, the intervening electrode is 20, for third and fourth membranes 12 and 26, the intervening electrode is 22, and so on. The porous membranes and electrodes form channels, such as 28, wherein unidirectional electroosmotic flow is 30. The stacking pattern of the alternating membranes and intervening electrodes enables generation of a unidirectional flow 30 within the applied electric field 32.

An electrical double layer is formed in each alternating layer of the EOP and moves in the same direction through the membrane stack due to the alternating positive and negative electroosmotic membrane. Depending on the ionic concentration, the thickness of the electric double layer, which is referred to as the Debye length, varies from 3 nm to 300 nm for deionized water. The Debye length may become comparable to the nanopores within the EOP, depending on the electroosmotic membrane used. Furthermore, the use of thin membranes and corresponding interspersed electrodes enables the application of high electric field strengths across each of the alternating electroosmotic membranes. In order to increase pumping pressure, a larger surface area is required for double layer formation, without affecting field strength across the pores. In the EOP stack, the oppositely charged Debye layers move through the successive electric fields, and the net movement results in relatively higher electroosmotic pressure development due to the dense arrangement of the pores.

Polarity of the surface and zeta potential dictates the electroosmotic flow direction. The basic flow principle of EOPs is based on the surface charge of the membranes and the formation of electrical double layers. For example, when an aqueous solution contacts a glass surface (or silica), the glass surface becomes negative due to the deprotonation of surface silanol groups. An electrical double layer forms at the surface as a result of the deprotonation. The surface charge attracts dissolved counter-ions and repels co-ions, resulting in a charge-separation and forming an electrical double layer. The mobile ions in the diffused counter-ion layer are driven by an externally applied electrical field. The moving ions drag along the bulk liquid through the membranes and develop the electroosmotic flow. The EOP stack enables formation of a large surface area for electric double layer, without increasing the overall diameter of the pores or the electric field strength across each individual pore. Thus, higher pumping pressure is obtained without necessitating high driving voltage.

The electroosmotic flow of the fluid builds up an electroosmotic pressure in the EOP using applied voltage. Unlike conventional pumps, one or more embodiments of the EOP generate high pressure at comparatively lower applied voltages. In accordance with one embodiment, the EOP is configured to operate by applying less than 25 volts across each of the membranes to achieve electric fields greater than 100 V/meter across each of the electroosmotic membranes within the pump. In one example, the EOP is operated at less than or equal to 10 volts. In some other examples, the EOP is configured to operate at less than or equal to 5 volts.

The pumping pressure may be tuned or modified based on the requirement of various applications. In some embodiments, the EOP (unit structure EOP or integrated EOP) is configured to generate a pressure of at least about 0.5 PSI. Current single membrane or single element EOPs provide pumping pressure between 0.1 and 0.75 PSI. In one or more embodiments, using different membranes, such as AAO membrane, the pressure generated is at least about 0.75 PSI. In some embodiments, by increasing the number of electroosmotic membranes in an EOP (or integrated EOP), the output pressure may be increased proportionally. In one exemplary embodiment, the EOP is configured in a series stack to generate a pressure of at least about 10 PSI. In some other embodiments, the pressure is increased up to 100 PSI, by increasing the number of stacked units of EOPs in an integrated EOP system.

The electroosmotic membranes are porous, more specifically the membranes are nanoporous. The diameter of the pores is about 10 nm to 500 nm. While stacking the membranes one after another, the pores of various membranes may be aligned in a straight line to form a continuous straight vertical channel starting from the top layer to the bottom layer (membrane), allowing a fluid to pass through the channels. In some embodiments, the pores of the various membranes may not be aligned in a straight line through the stacked membranes to form a straight channel. In these embodiments, although the pores are not aligned in a straight line, the fluid can still pass through the non-linear channels formed across multiple membranes.

Flow direction for positive electroosmotic membranes is different than that of the negative electroosmotic membranes. When the surface charge of the membrane is positive, the fluid flow proceeds in the direction of the electric field, and when the surface charge is negative, the fluid flow proceeds in the direction opposite to the electric field. The membranes may be stacked without individual electrical insulation. Therefore, the membranes are merged, with a common electrode in between two membranes, and the fabrication technique resolves the problem of individual electrical insulation, and increases the pressure using multiple membranes. The additive pressure in series results from the membrane stacking.

The selection of electroosmotic membranes is typically restricted to a thin membrane, as the thin-nanoporous membrane structure increases the electric field strength at a given applied voltage. Each of the membranes has a thickness of about 10 nm to 10 mm. In one exemplary embodiment, 60 μm thick bare or silica-coated AAO membranes are used in the EOP stack, wherein the interspersed electrodes are Pt directly sputtered on the membrane surfaces. In another exemplary embodiment, the interspersed electrodes are comprised of a thicker, porous paper substrate coated with a conductive polymer.

The composition of the electroosmotic membranes may vary. In some embodiments, the electroosmotic membranes comprise one or more dielectric materials or polymers with grafted ionizable functionalities to achieve zeta potential similar to the dielectrics, and combinations thereof. The dielectric materials may comprise but are not limited to tungsten oxide, vanadium oxide, silicon dioxide or silica, common glasses such as silicates, silicon carbide, tantalum oxide, zirconium oxide, hafnium oxide, tin oxide, manganese oxide, titanium oxide, silicon nitride, chromium oxide, aluminum oxide or alumina, zinc oxide, nickel oxide, magnesium oxide and combinations thereof.

In some embodiments, the electroosmotic membrane may be an insulator. In some embodiments, the electroosmotic membrane may comprise an oxide, metal oxide or a metal nitride. Any of the oxides, metal oxides or nitrides may be used in the membrane, and may comprise but are not limited to hafnium oxide, zirconium oxide, alumina, or silica, as the insulators. The electroosmotic membranes may comprise polymers, selected from PDMS, COC, PMMA, PC, or other materials with graftable surface chemistries.

Figures 2A, 2B:
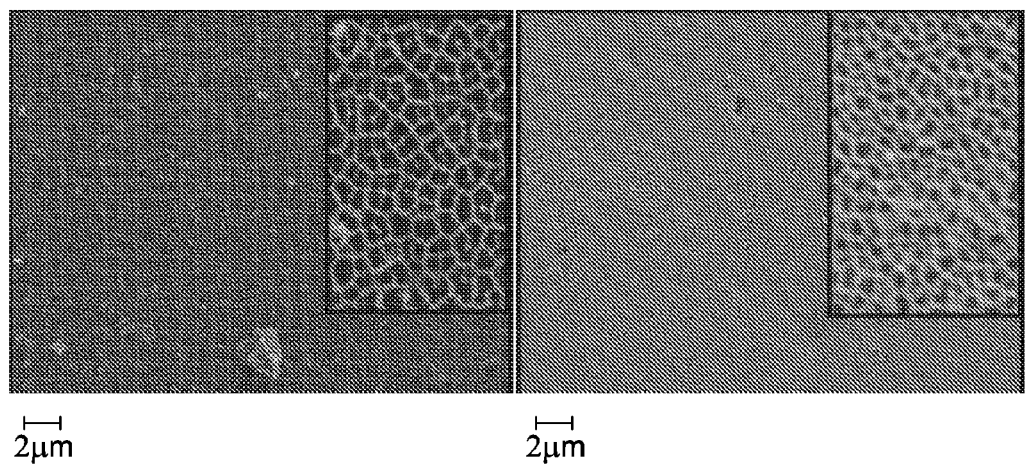
FIG. 2 is an example of SEM images showing a bare anodic aluminum oxide (AAO) electroosmotic membrane and a silica treated AAO electroosmotic membrane.

Depending on the surface electric charge, the electroosmotic membranes may be divided in two types, positive electroosmotic membranes and negative electroosmotic membranes. The positive electroosmotic membrane may comprise a material with a surface charge similar to silica in DI water and the negative electroosmotic membrane may comprise a material with a surface charge similar to alumina in DI water, and at a neutral pH. In some embodiments, the AAO membrane is coated using a sol-gel material deposition, chemical vapor deposition (CVD) atomic layer deposition (ALD), or molecular vapor deposition (MLD). The fabrication techniques are used to produce the AAO membrane with an expected surface charge. For example, a bare AAO membrane contains a positive surface charge in water. In another example, the bare AAO membrane (FIG. 2A), is treated with silica to form the silica coated membrane (FIG. 2B) that contains the negative surface charge in water. The SEM images of the bare AAO membrane and the silica coated AAO are shown in FIG. 2A and FIG. 2B. By selecting an appropriate surface coating material such as silica, the flow rate of the fluid passing through the membrane may be increased.

In one embodiment, the electroosmotic membranes used in the EOPs are hydrophilic in nature, which enables the membrane to wet out quickly and completely. Hence, the hydrophilic membranes eliminate the need for expensive pre-wetting treatment and increase the flow rate of the fluid passing through the membranes of the EOPs.

In one or more embodiments, the EOPs described herein, control the surface zeta potential of the membrane by embedding internal electrodes. For example, by embedding thin Pt electrode layers in the insulating membrane stack, the zeta potential of the surface of the membrane may be actively controlled. The zeta potential of the membrane may vary as a function of buffer, ionic strength and pH, and the surface characteristics. In one embodiment, the electroosmotic membrane has a zeta potential in a range of −100 mV to +100 mV. The magnitude of zeta potential for aluminum oxide in contact with 1 mM KCl, at pH=7 is 37 mV. The zeta potential for silica, zinc oxide, and zirconia is |f|=80 mV; 45 mV and 90 mV, respectively.

Figure 3:
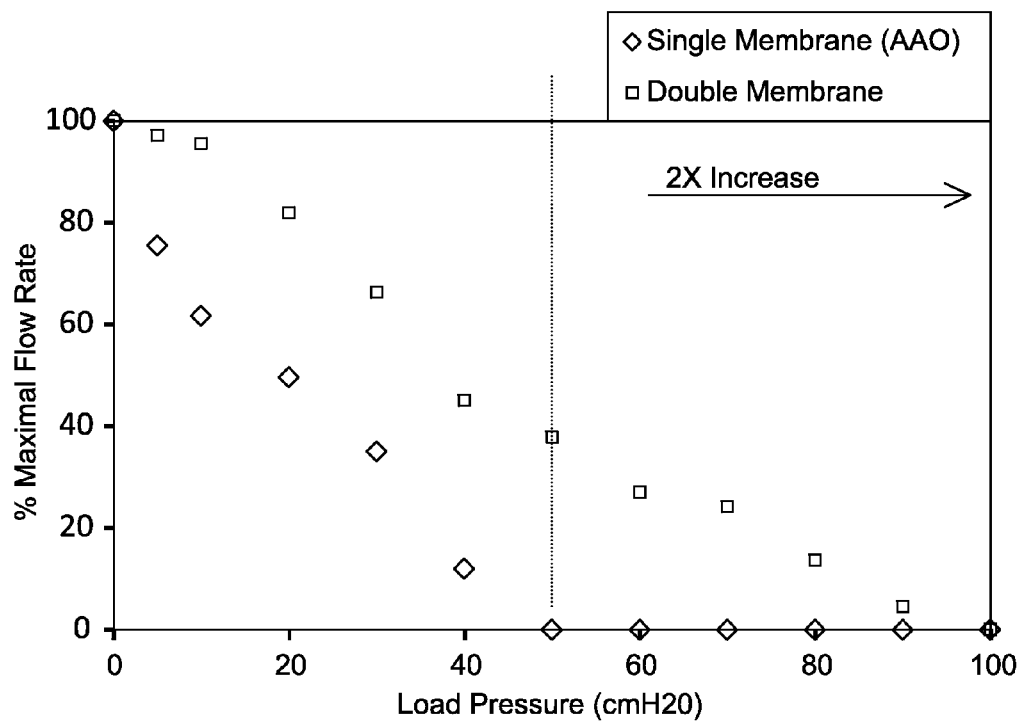
FIG. 3 is an example of a graph showing increased pressure generated by an embodiment of an EOP with multiple (double) porous substrates of the invention as compared to an embodiment of an EOP with a single porous substrate.

By increasing the number of membranes, the EOPs are able to increase the operating pumping pressure. As noted, the basic unit structure of the EOP comprises at least 2 membranes, wherein the surface charges are opposite for two membranes at the time of the fluid flow through the membranes under the influence of the electric field. In some embodiments, the EOP comprises about 2 to 100 membranes in series. The total output pressure increases proportionally to the number of membranes within the stack, and the pump is designed based on the application specific fluidic load. Hence, the efficiency of the EOPs may be changed, such as increasing or decreasing the pressure, according to the user's need. For example, the stall pressure of an EOP comprising a double stack of an AAO and a silica coated AAO is higher compared to an EOP with single AAO, as shown in FIG. 3.

The result shows a 2× increase in pumping pressure with the double stack membrane. The flow rates, measured by a commercial micro-electromechanical systems (MEMS) flow sensor, decreases with increasing applied back pressure to the pump and the stall pressure is identified at the zero flow position. In one or more examples, at least two membranes are required to construct a single unit of EOP and this one unit of EOP generates pressure of about 2 PSI. In another example, an EOP constructed with 20 membranes generates pressure of about 40 PSI.

As noted, the EOP comprises a plurality of electrodes, wherein the electrodes are disposed on the electroosmotic membranes. The electrodes employed by the EOP are macroporous, which allow transverse fluid flow. In some embodiments, the diameter of the macropores present on the electrodes may be in a range of 50 nm to 10 mm. In one embodiment, the diameter of the macropores is 1 mm.

Figure 4:
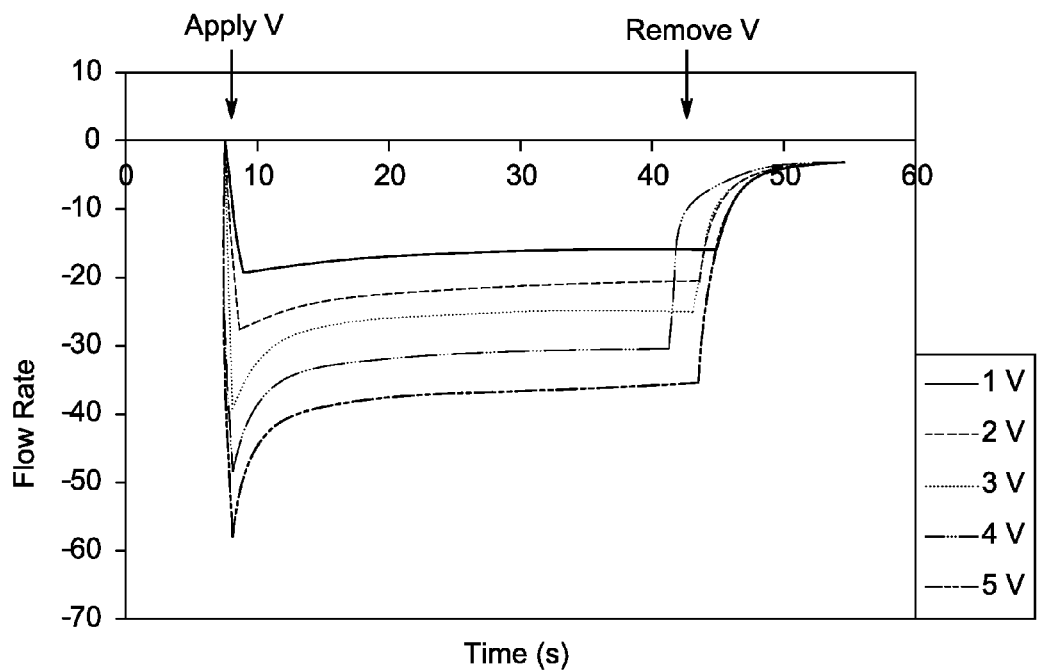
FIG. 4 is an example of a graph showing a steady flow rate obtained from an EOP assembly of the invention, driven at different voltages.

In one or more embodiments, the use of redox polymer electrodes increases the flow rate at the same applied voltage compared to some of the conventional metal coated electrodes. The increase of flow rate is due to the elimination of the over-potential, which is required to drive the pumps comprising metal coated electrodes using hydrolysis. For example, operation of integrated EOP assembly with paper or cellulose electrodes enable the EOP to generate a stable flow rate of 10's μL/min at voltages below 5 V, as shown in FIG. 4.

The material composition of the electrodes may vary. In some examples, the electrodes comprise a macroporous metal, redox metal salt, metal oxide, metal nitride, conductive polymer, redox polymer and combinations thereof. In some embodiments, the electrodes comprise a metal. The examples of materials used for electrodes include, but are not limited to, noble metals such as Au, Ag, Ru, Rh, Pt or Hg, redox metal salts such as Ag/AgCl or Ag/AgI, and metal oxide such as Ta2O5, RuO2 or AgO.

In some embodiments, structural supports for the electrodes are made of conductive polymers, may be selected from polyacetylenes, polyphenylene vinylenes, polypyrroles, polythiophenes, polyanilines, polyphenylene sulfide or polyfluorenes. In some embodiments, the electrodes are made of a base material, such as a macroporous polymer, coated with a conductive material. In one embodiment, the electrodes are coated with redox polymer, redox metal salts or metal oxides. In some embodiments, the electrodes are coated with redox polymers, which include but are not limited to PEDOT, PEDOT:PSS, Poly(1,5-diaminoanthraquinone), poly(2-2-dithiodianiline) or pDTDA. In some examples, the electrodes comprise a porous deposition of an inert metal or a thick mesh of an inert metal, such as Pt. The electrode may further comprise a coating made by a thin deposition of a metal on a thick porous substrate. The electrode may be coated with a conductive or redox polymer on a thick porous substrate. In some other embodiments, the electrode may comprise a thin electroplating of a metal salt or oxide and combinations thereof.

In some embodiments, the electrodes are made of macroporous polymers. In some embodiments, the macroporous polymers such as glass or rubbery polymers, which maintain porosity in a dry state or when immersed in a solvent, may be used as electrodes. The macroporous polymer may include, but are not limited to, natural papers such as cellulose; synthetic paper such as polypropylenes or polyethylene, synthetic sponges such as polyethers, PVA, or polyesters; or polymer mesh material such as Polyurethane, PTFE, nylon, or polyethylene. In one embodiment, cellulose is used as electrodes, by soaking a paper in a conductive polymer.

In one or more embodiments, the polymeric material used, as structural support for the electrodes, or as coating for the electrodes is selected from poly(olefins), halogenated poly (olefins), poly(cylco olefins), halogenated poly(cylco olefins), poly(styrenes), halogenated poly(styrenes), poly(propylenes), poly(ethylenes), halogenated poly(ethylenes), poly (tetrafluoroethylenes), poly(sulfones), poly(ether sulfones), poly(arylsulfones), poly(phenylene ether sulfones), poly(imides), poly(etherimides), poly(vinylidene fluorides), poly(esters), halogenated poly(esters), poly(ethylene terephthalates), poly(butylene terephthalates), poly(carbonates), poly (vinyl halides), poly(acrylics), poly(acrylates), halogenated poly(acrylates), poly(methacrylics), poly(methacrylates), poly(anhydrides), poly(acrylonitriles), poly(ethers), poly (arylene ether ketones), poly(phenylene sulfides), poly (arylene oxides), poly(siloxanes), cellulose acetates, cellulose nitrates, poly(amides), nylon, ceramics and combinations thereof.

In one or more examples, the nanoporous membranes, such as, Al2O3 or silicon membrane may be coated with a thin conducting layer of metal, such as Pt, or a conducting material. In some other examples, the electrode material is sputtered on the membranes, for example Au, Pt or any other noble metal may be sputtered on the porous Al2O3 or silicon membrane surface to form anode and cathode and generate an external electric field.

A nanoporous EOP assembly may be disposed in a channel to form an electroosmotic flow setup. The channel may be a microfluidic channel. In some examples, gas bubbles are released on the Pt electrode surface and impede flow through the EOP. However, in one embodiment of the multiple membrane-based EOP, stable flow rates of the fluid may be achieved within seconds, even when pumping into channels or structures with high hydraulic resistance. This is due to the high pumping pressure of the stacked EOPs and the fact that, the redox electrodes reduce bubble formation within the pump and therefore allow use of the EOPs in microchannels without interruption.

In one example, the AAO is selected as the membrane and cellulose is selected as the electrode, wherein the cellulose (or paper) electrodes are coated with a conductive liquid polymer. Hence, the EOP allows the AAO membrane stacking by disposing multiple pieces of paper (cellulose) wetted with a conducting polymer solution as electrodes in between each of the AAO membranes. As noted, the EOP is configured to generate a transverse fluid flow through the AAO and paper stack.

In one embodiment, the EOP is packaged with a power source, wherein the entire pump assembly may be self-contained. The low voltage operation described herein requires minimal current draw within each of the serially connected membranes of the EOPs. Hence, the multiple membrane-based EOPs generate higher pressures without the requirement of a large power supply.

Figure 5A:
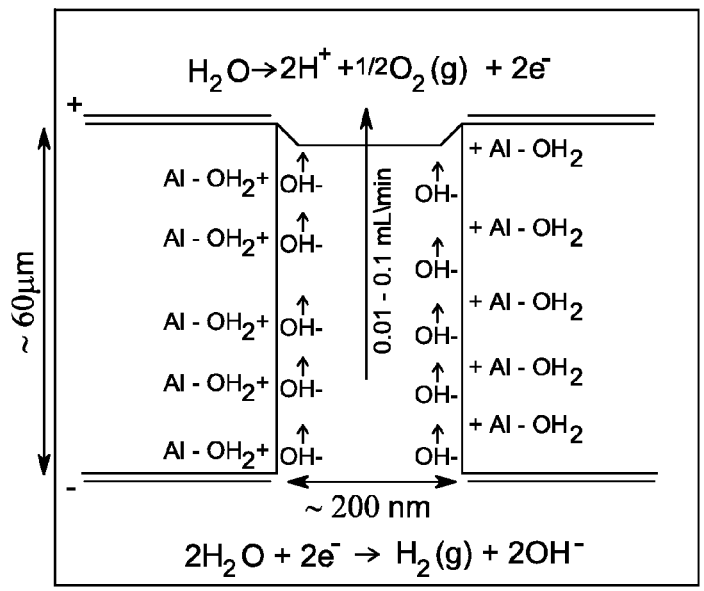
FIGS. 5A-5C are examples of the EOP operation with alternative electrode materials.

In one or more embodiments, a power source is used to provide a voltage between about 0.1 to 25 volts, wherein the membranes and electrodes are operably coupled to the power source to generate a pressure of at least about 0.75 PSI. In some other embodiments, a power source may be used to provide a voltage between about 0.1 to 10 volts, wherein the membranes and electrodes are operably coupled to the power source to generate a pressure of at least about 0.75 PSI To provide a sustained current without interrupting a fluid flow in an EOP remains a challenge so far, which is addressed herein by using various electrodes including metal oxide or polymeric electrodes. A voltage applied to the electrode within the EOP stack results in a passage of an ionic current through the electroosmotic membranes. For example, a voltage applied to the standard Pt electrode results in a hydrolysis followed by generating gas to the electrodes, as shown in FIG. 5A. In EOPs, the hydrolyzed ions are formed at the surface of the metal electrodes, thus releasing hydrogen and oxygen gas at opposite ends of the nanopores (FIG. 5A).

Figure 5B:
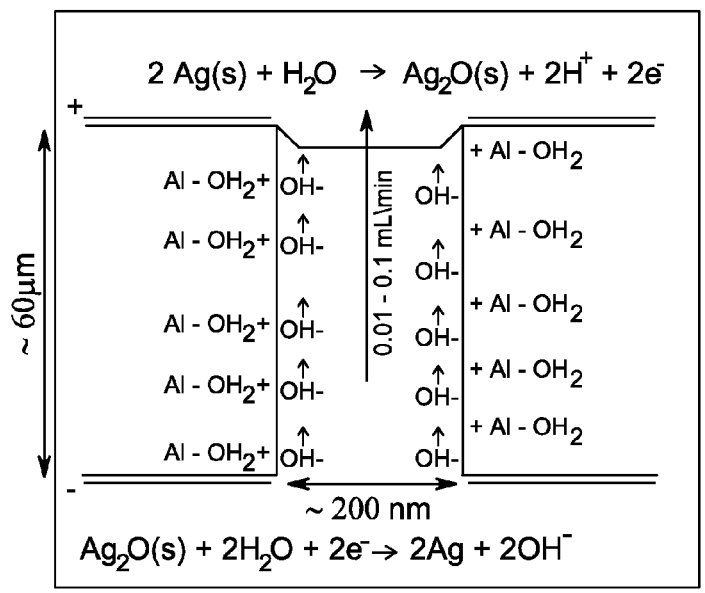
Figure 5C:
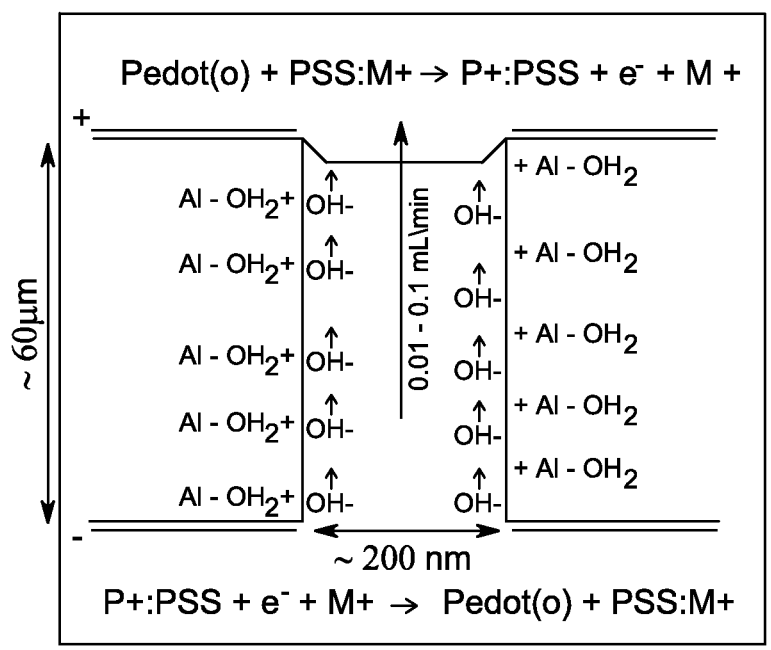

Though gas accumulation may be minimal at the low driving voltages, bubble formation remains a problem in the dense nanoporous stacks. A voltage applied to a metal oxide electrode, such as silver oxide electrode results in redox reaction as shown in FIG. 5B. Similarly, a voltage applied to the conductive or redox polymer electrode, such as PEDOT/PSS electrode also results in a redox reaction as shown in FIG. 5C. In either case, the current passes across the membranes of the EOP due to the generation of ions by the reactions at the electrodes and the current exists until reactive sites in the electrodes are exhausted.

Figure 6A:
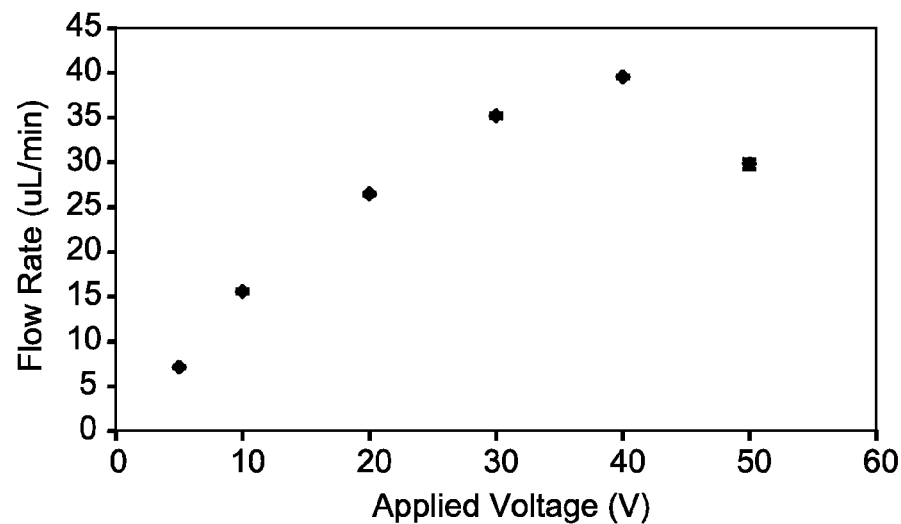
FIG. 6A is an example of a graph showing pumping efficiency of an embodiment of an EOP of the invention using platinum mesh electrodes between nanoporous AAO membranes and FIG. 6B is an example of a graph showing pumping efficiency of an embodiment of an EOP of the invention using Pedot:PSS saturated cellulose paper electrodes between nanoporous AAO membranes.

An example operation of EOP assembly using Pt mesh electrodes between nanoporous AAO membranes is shown in FIG. 6A. The platinum mesh electrode is made from a wire with 0.06 inch diameter, and the AAO membranes have 20 nm pore size. The graph of FIG. 6A reflects an increased flow rate with increasing applied voltage, though the flow rate in this example plateaus and then decreases after a certain applied voltage, such as 40 V. The EOP may be used in a larger fluidic system as the pressure source, wherein the overall flow rate in the total system may depend on the hydraulic resistance of that system, and the pressure output of the pump. In one embodiment, the pressure output is determined by the number of membranes present within the EOP stack.

Figure 6B:
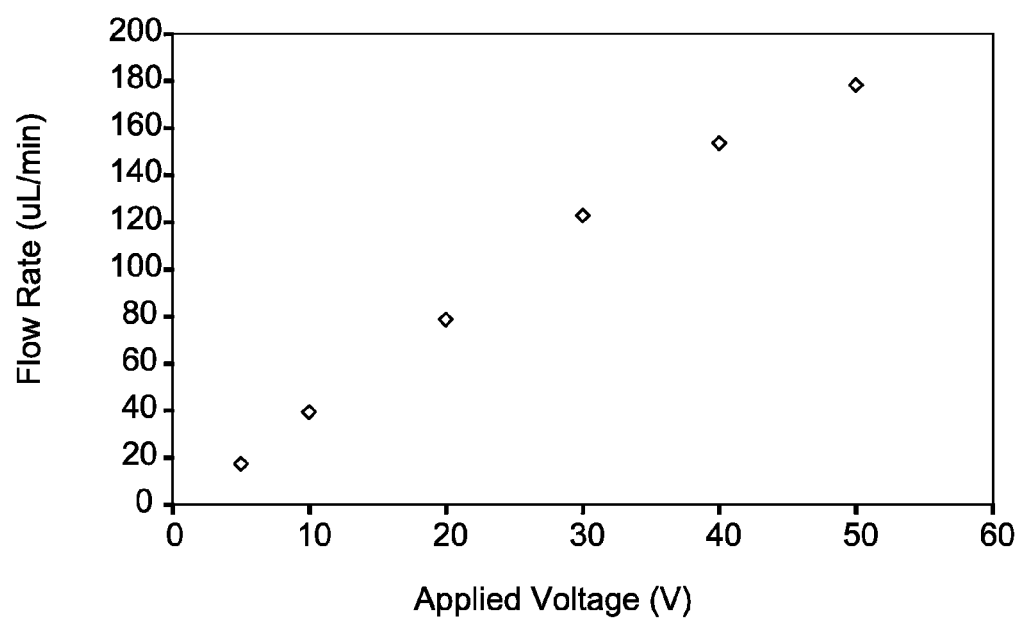

An example operation of EOP assembly using Pedot:PSS saturated cellulose paper electrodes between nanoporous AAO membranes is shown in FIG. 6B. The paper electrode has 0.5 mm paper thickness, and the AAO membranes are with 20 nm pore size. The graph of FIG. 6B reflects the increased pumping efficiency with increased applied voltage. The increased pumping efficiency is due to uniformity of the electric field, when compared to the Pt mesh electrode (with diameter of 0.06 inch), and elimination of the over-potential required when using Pt electrodes. Utilization of the redox polymer eliminates the challenge of gas production at metal electrodes, and enables uninterrupted EOP operation.

In one or more embodiments, the high pressure EOP may comprise a control circuit to maintain a constant current or voltage, and therefore maintains a constant fluid flow or pressure output during an operation. In one embodiment, the EOP comprises a controller to maintain a constant fluid flow. In one example, the controller comprises a micro controller circuit.

In some embodiments, a conductive paste, resin, or glue is deposited onto the electrode to create a common electrical connection to the membranes within the membrane stack. In other embodiments, metal coatings or foils are used to make an external electrical connection to the membranes within the stack. In one example, a silver paste is deposited on each of the electrodes to take a common connection output from the membrane stack.

One or more examples of the method for depositing electrodes and patterning the electroosmotic pumps comprise contact printing, photolithography or wire bonding techniques. The area of external metal cathode and anode may be coated by photolithographic patterning. An E-beam evaporation or alternative sputter process may be applied for initially disposing or depositing metal (e.g. Au, Pt, or any noble metal) electrodes as anodes or cathodes on both sides of the membrane (e.g., porous anodic aluminum oxide or macroporous silicon). The metal cathode or anode may be adapted to cover the surface of the AAO membrane without obstructing the openings of the nano-pores.

In the EOPs, the fluid may be electroosmotically pumped through one or more membranes transversely. In one embodiment, the fluid is electroosmotically pumped between two membranes that are stacked one upon another, wherein the membranes are either directly in contact or spaced with a small distance of 1 mm or less. Larger distances within the EOP stack may decrease electric field strengths across the electroosmotic membranes, and therefore flow rates within the pump. Therefore, a pump may sustain high back pressure (e.g., >1 atm) and still maintain adequate fluid flow when a gap between two of the membranes is small, for an example, 500 μm. The EOP of this embodiment increases the pumping pressure associated with low voltage (battery) EOPs, enabling use in field-able, self-contained, and battery-operated systems.

In some embodiments, the membranes are further operatively connected to at least two reservoirs comprising fluids. In one embodiment, the pumping liquid or fluid or working solution, which is used in the EOP has a pH from about 3.5 to 8.5. In an alternative embodiment, the pumping solution is a borate buffer with a pH of about 7.4 to 9.2 and an ionic strength between about 25 to about 250 mM.

The core structure for the membrane and electrodes may be adapted to function with other pump components such as, for example, fluid chambers, inlet port(s), and outlet port (s). These applications for EOPs include, but are not limited to, lab-on-a-chip devices and applications, inkjet printing, ink delivery, drug delivery, liquid drug delivery, chemical analysis, chemical synthesis, proteomics, healthcare related applications, defense and public safety applications; medical applications, pharmaceutical or biotech research applications, environmental monitoring, in vitro diagnostic and point-of-care applications, or medical devices. In one embodiment, the EOPs may also be incorporated into MEMS devices. Other applications include, but are not limited to, PCR (DNA amplification, including real time PCR on a chip), electronic cooling (e.g., for microelectronics), pumping ionized fluids and colloidal particles, or adaptive microfluidic mirror arrays.

Moreover, high pressure EOPs may be coupled to one or more mechanical valves and switches, and used as an actuating pressure source, in contrast to a conventional mechanical actuators. Furthermore, implementation of such self-contained fluid control systems from a limited number of materials using simple fabrication techniques enable application of the portable pump and control elements within the disposable cartridges. Some more examples include, electroosmotic valves using the EOPs by opposing pressure driven flow, use of the EOPs to fill and empty flexible reservoirs to induce functionality via shape change and electroosmotic-actuators. A benefit for at least one of the embodiments is high throughput screening and compound profiling.

For developing electroosmotic actuators or electroosmotic valves, the battery-operated EOP is desirable. Pumping of complex buffers and reagents, typically associated with bioanalysis, may be achieved using one or more EOPs associated with one or more valves present in a number of parallel, valved-chambers Each of the chambers may contain different types of buffers or reagents which are different from the running buffer. The running buffer may be used either for moving fluid or reconstituting dried materials from each of the chambers. Pressure and flow rates generated from the EOPs may be controlled to mix the fluids collected from different chambers, wherein the EOP actuation may be utilized to create a self-contained system. In some embodiments, the self-contained system may be used for controlling the concentration of each of the fluids to be mixed or to flow in various channels/chambers. In this case, the flow rate and duration of each EOP-based valve actuation may control the amount of fluid that enters to or exits from each storage chamber.

Typically, EOP experiments are conducted with DI water or buffers and the addition of some pH buffering compounds, or even simple salt solutions decreases the flow rate and pressure output. However, the pumping pressure of EOPs may be increased by varying the number of membranes in the EOP stack. Various types of valves may be used in different devices for actuating and controlling the fluid flow, and therefore to control or maintain the fluid concentrations. Non limiting examples of the valves may include a ball valve, butterfly valve, check valve, choke valve, pinch valve and gate valve. Each of the valves may have different designs.

As noted, the examples of a method of actuating a valve comprises operatively coupling of the valve with an EOP, flowing a fluid through the EOP, and generating a fluidic pressure of at least 0.75 PSI to actuate the valve. In this example of the method, the EOP comprises one or more thin, porous, positive electroosmotic membranes and one or more thin porous, negative electroosmotic membranes; a plurality of electrodes comprising cathodes and anodes, and a power source; wherein each of the positive and negative electroosmotic membranes are disposed alternatively and wherein at least one of the cathodes is disposed on one side of one of the membranes and at least one of the anodes is disposed on other side of the membrane and wherein at least one of the cathodes or anodes is disposed between a positive and a negative electroosmotic membrane.

In one example of the method, the required fluidic pressure is of about 0-30 PSI to actuate the valve, or in some embodiments the required fluidic pressure is of about 30-75 PSI to actuate the valve. The fluidic pressure is generated by operating the EOP by applying less than 25 volts across each of the membranes. The application of less than 25 volts across each of the membranes achieves electric fields greater than 100 V/m across each electroosmotic membrane within the pump.

In some examples of methods, the fluid flows through the electroosmotic pump in a transverse direction with a flow rate of about 0.1 μL/min to 10 mL/min per cm2 of surface area across the membranes.

In one or more examples of the methods, the EOP is further operatively coupled to at least one reservoir comprising a fluid, may be referred to herein, as pumping fluid which passes through the EOP and then actuates the valve. In another example of the method, the fluid flow is controlled to maintain a constant fluidic pressure using a voltage or current controller. A mechanical or control circuit may also be used to selectively or successively apply voltage between a number of EOPs, and therefore control actuation among a number of valve or storage chambers.

Figure 7B:
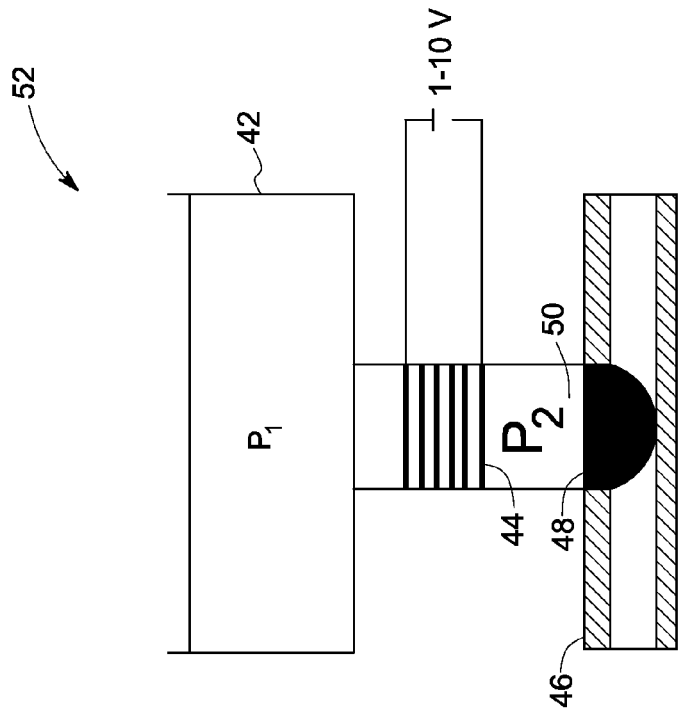
FIGS. 7A and 7B are schematic representations of two different embodiments of separate EOP actuations at 0V and at 1-10 V respectively.
Figure 7A:
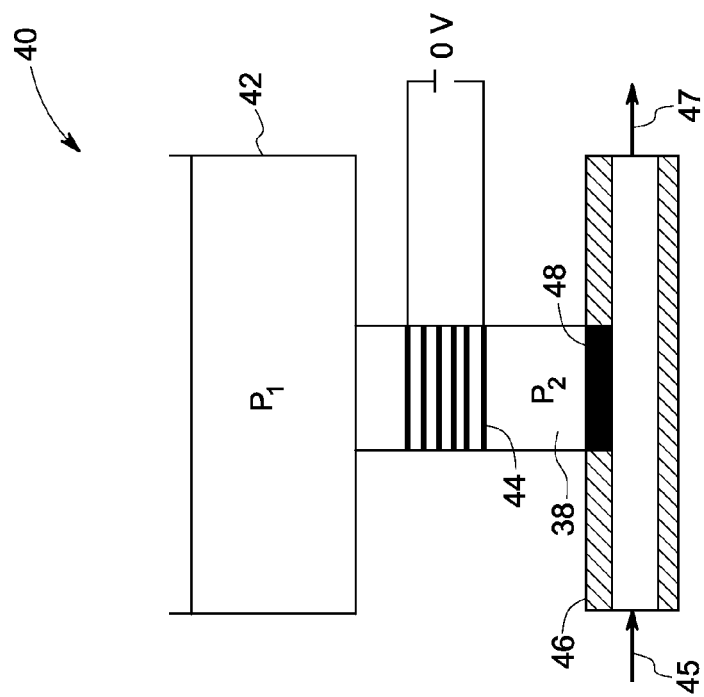

FIGS. 7A and 7B illustrate the mechanism of actuation of a valve placed in a microfluidic channel. In one exemplary embodiment, FIG. 7A shows an example schematic of an EOP operably coupled to an elastomeric pinch-valve, such as the microfluidic valves utilized in GE's Biacore™ SPR system. In one illustrative example 40 (as shown in FIG. 7A), a reservoir 42 contains a fluid having a fluidic pressure P1, wherein the fluid is subjected to flow through the EOP 44 and then through the microfluidic channel 46. The EOP 44 is situated between the reservoir and the valve, and the fluid present in the chamber 38 of the EOP has a fluidic pressure of P2. The valve 48 is placed in an interface of the EOP 44 and the channel 46. The EOP pump 44, as shown in the center, allows liquid from a small reservoir 42 into a small chamber 38 directly above the valve 48, increasing the pressure above the valve and forcing the elastomeric component 48 into the channel below 45/47. The fluid enters to the microfluidic channel through the inlet 45, passes through the channel and exits through the outlet 47. The EOP 44 is not able to generate any pressure difference, as the pressures P1 and P2 are same at 0 V and unable to actuate the valve 48 as well, which results in fluid flow through the channel 46 without any hindrance.

FIG. 7B shows, the elastomeric component 48 may be used to valve off the channel, if the stall pressure of the pump (the back pressure at which the EOP stops moving liquid from one chamber to the next) is larger than the actuation pressure of valve. In another illustrative example 52 (as shown in FIG. 7B), a reservoir 42 contains a fluid having a fluidic pressure P1. The fluid is subjected to flow through the EOP 44 followed by passing through the microfluidic channel 46. The fluid present in the chamber 50 on the opposite side of the EOP has a fluidic pressure P2. The valve 48 is placed in an interface of the EOP 44 and the channel 46. In this example, using the applied voltage between 1 to 25V, the fluid flows through the EOP 44 and that causes increasing the pressure P2 in the chamber 50 of the EOP. Once P2 exceeds the valve closing pressure, the valve opens to the channel results in blocking of the channel. Therefore the pressure difference, herein, results in an actuation of the valve 48, which blocks the fluid flow through the channel 46. This concept may be expanded to include multiple EOP-operated valves in series or in parallel.

Figure 8:
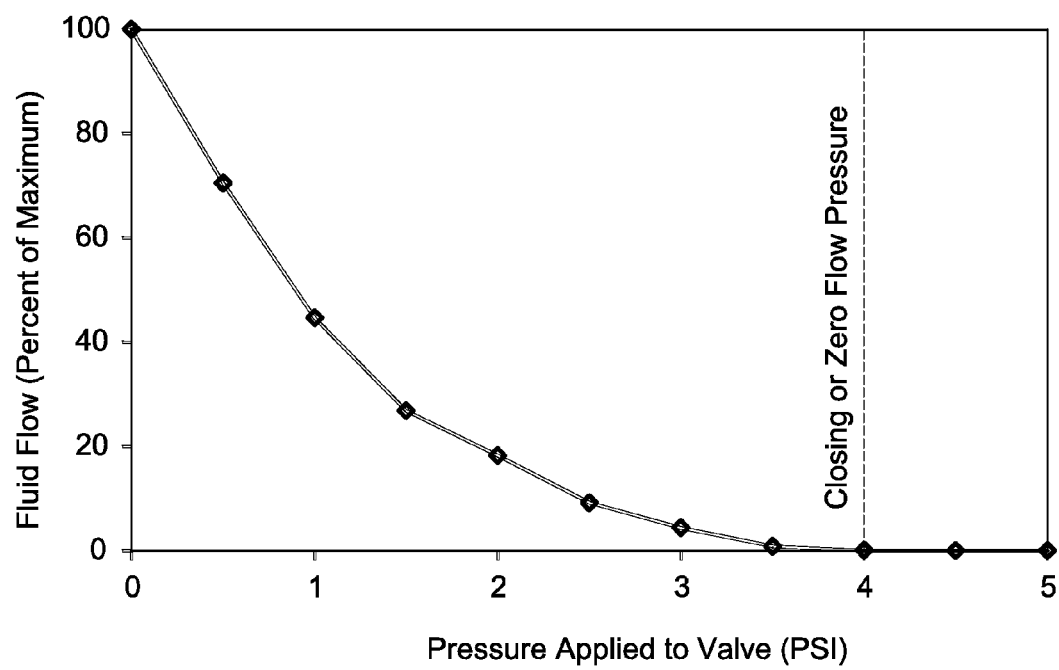
FIG. 8 is a graph showing the pressure requirement for actuating a version of a microfluidic valve.

As an example, FIG. 8 shows the pressure requirement for actuating a version of the elastomeric microfluidic valve contained within GE's Biacore™ (SPR technology) system. A flow rate is measured with the valve in an open configuration, by applying a pressure. As the valve closes and fluidic resistance increases, the flow rate of the fluid passing through the channel decreases, and becomes zero at the pressure of 4 PSI, as shown in FIG. 8. The valve shows full closure at 4 PSI, showing that the further actuation is possible only while using pressure of at least more than 4 PSI using valves (as shown in FIGS. 7A and B) combined with the high pressure EOPs, unlike the valves combined with standard low pressure EOPs. In this example, the valve actuation fluid is separated from the fluid in channel by the elastomeric valve.

In some embodiments, the method of actuation of the valve enables mixing of multiple buffers or reagent components, wherein the buffer or reagent components are placed in a serial, parallel, or combination of serial and parallel positions with the EOPs.

Figure 9:
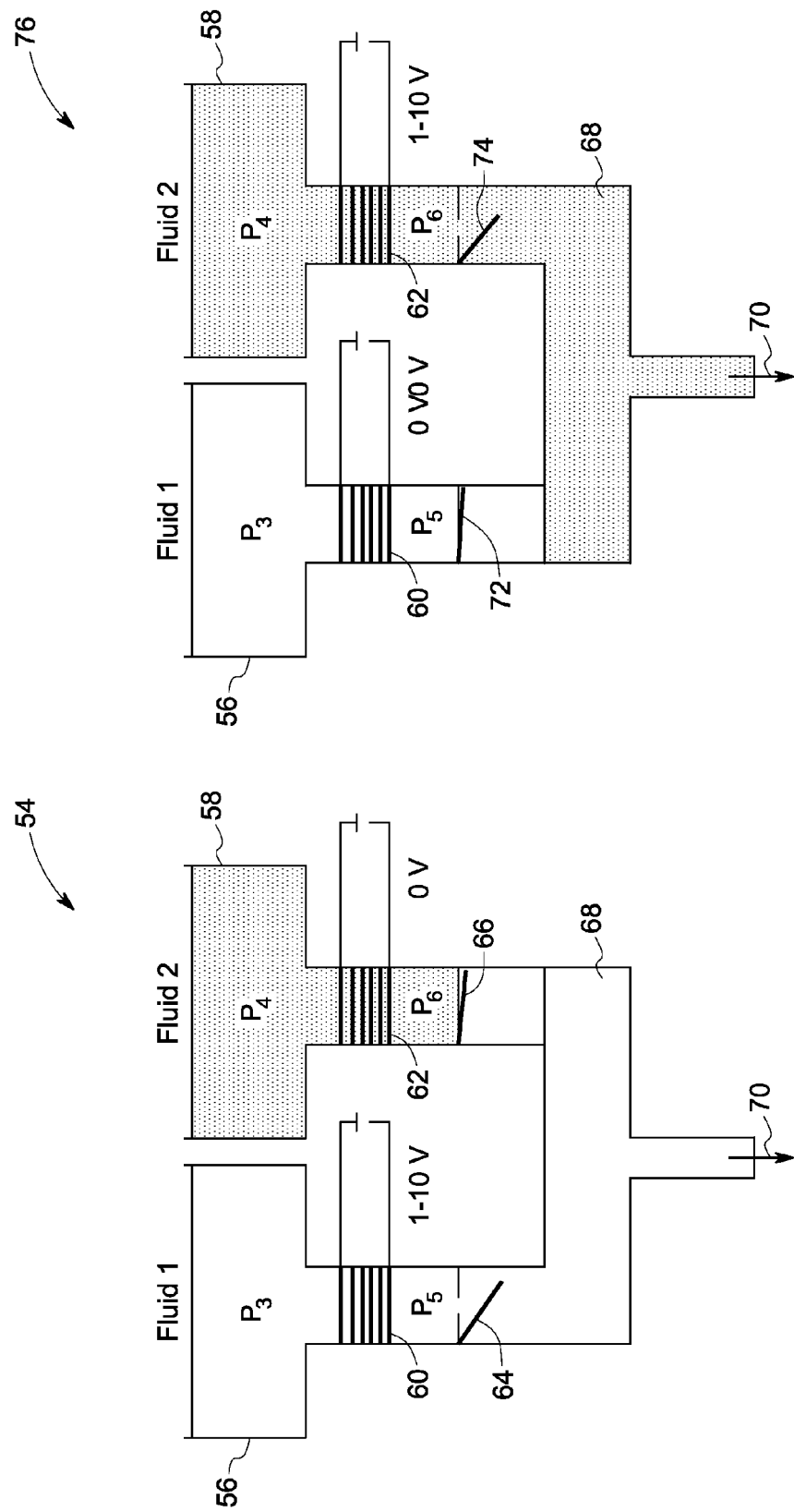
FIGS. 9A and 9B are schematic representations of two different embodiments of in-line EOP actuations at 0V and at 1-10 V respectively.

In an exemplary embodiment, a self-contained fluidic valve is used in a fluid path, wherein for example, the valve is a check valve. Two check valves regulate the flow of two different fluids through a single channel by actuating the valves depending on the required fluid flow, as illustrated in FIGS. 9A and 9B. Depending on the requirement of one particular fluid flow, such as fluid 1, the appropriate valve may actuate while applying voltage to the corresponding EOP.

FIGS. 9A and 9B show a schematic example of two in-line check valves operatively coupled to high pressure EOPs. Two fluid reservoirs 58 and 56 are connected to a single outlet 70 through 2 separate EOPs 60 and 62. The choice of fluid flowing through the single outlet is made by applying a voltage, and initiating a flow through one of the two EOPs. The EOP actuates the in-line check valve 72 or 74, and allow fluid movement from one of the reservoirs to the outlet. At the same time, the opposite check valve is forced shut, isolating the fluid flow from the second reservoir. Initiation of the flow in the other EOP causes actuation of the opposite check valve, and flow from the other reservoir.

As illustrated in FIG. 9A, an exemplary embodiment of a system 54, wherein two reservoirs are 56 and 58. The reservoirs 56 and 58 hold fluid 1 and fluid 2 with fluidic pressure P3 and P4 respectively. The reservoir 56 is connected with an EOP 60, and the check valve 64 is placed downstream of the EOP 60. In the EOP 60, the fluidic pressure is P5. The microfluidic channel is connected to both of the chambers 56 and 58 and has an outlet 70. The reservoir 58, which contains fluid 2, is connected to the EOP 62, and the check valve 66 is placed downstream of the EOP 62. In the EOP, the fluidic pressure is P6. In this example, the voltage between 1 to 25 V is applied to the EOP 60, which results in increasing the fluidic pressure P4. Once the pressure P4 exceeds the valve opening pressure, the check valve 64 opens to the channel results in releasing of the fluid 1 to the channel 68 and exits through the outlet 70. The EOP 62 remains inactive at 0 V and the fluid 2 remains intact in the reservoir 58.

FIG. 9B illustrates another exemplary embodiment of a system 76, wherein the check valve 74 actuates to release the fluid 2 depending on the requirement of fluid 2 in the channel 68. FIG. 9B shows, the system 76 which comprises two reservoirs 56 and 58. The reservoirs 56 and 58 hold fluid 1 and fluid 2 with fluidic pressures P3 and P4 respectively. The reservoir 56 is connected with an EOP 60, and the check valve 72 (closed form) is placed downstream of the EOP 60. The fluidic pressure in EOP 60 is P5. The microfluidic channel is connected to both of the chambers 56 and 58 and has an outlet 70. The reservoir 58 is connected to the EOP 62, and the check valve 74 (open form) is placed downstream of the EOP 62. In this example, the voltage between 1 to 25 V is applied to the EOP 62, which results in increasing the fluidic pressure P6. Once the pressure P6 exceeds the valve opening pressure, the check valve 74 opens to the channel 68, which results in releasing of the fluid 2 to the channel 68 and exits through the outlet 70. The EOP 60 remains inactive at 0 V, and the fluid 1 remains intact in the reservoir 56. This concept may be expanded to include multiple EOP-operated valves in parallel or in series.

Figure 10:
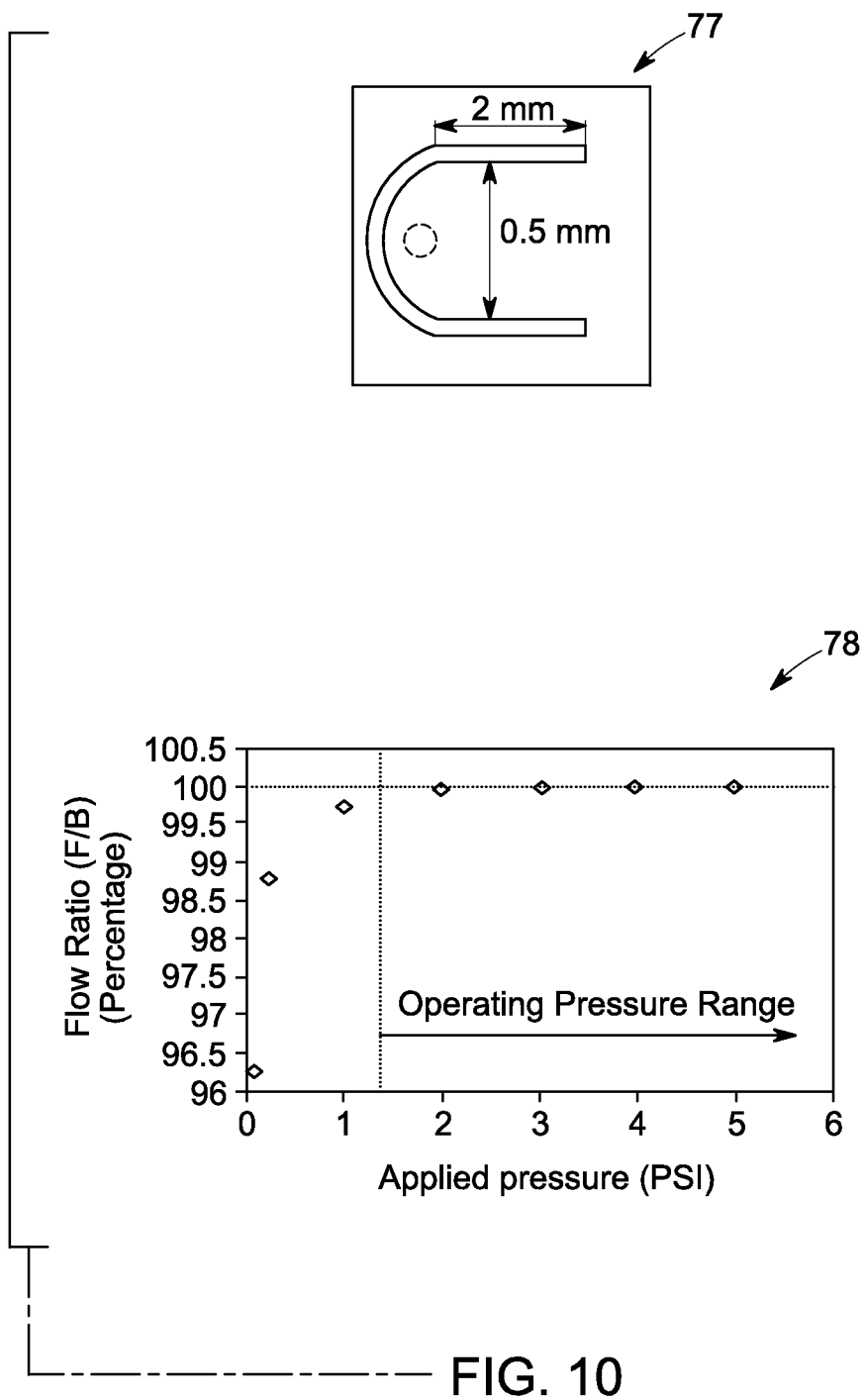
FIG. 10 is a graph showing an operating pressure range for valve actuation.
Figure 11:
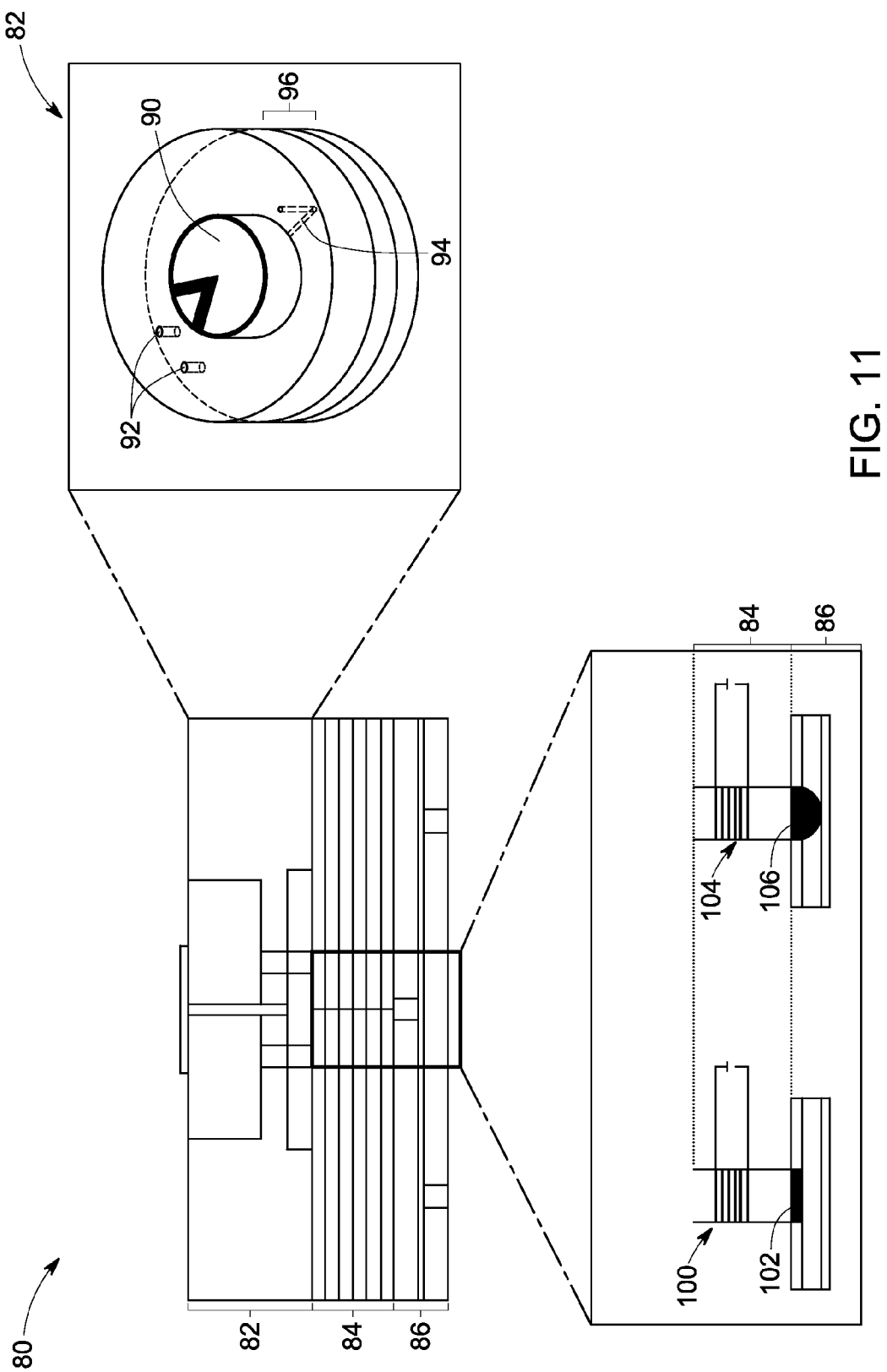
FIG. 11 is a schematic representation of an embodiment of a self-contained device comprising EOP.

The actuation of similar type of check valve as illustrated in FIGS. 9A and 9B, which requires at least 1.4 PSI pressure as shown in a graph 78 in FIG. 10. The operating pressure for this type of check valves 77 (FIG. 10), in general, is greater than 1 PSI. The schematic in FIG. 11 illustrates the approximate/relative sizes of the actuating EOP stack 84 and battery power source 90, compared to a Biacore-type pinch valve 86 (inset 84). The valve, actuator, and power source are all self-contained on the device, unlike traditional microfluidic valve and control structures that require pneumatic control lines, external pressure sources, or high voltage power supplies.

In one or more embodiments, a microfluidic device comprises one or more valves, and one or more EOPs, wherein one or more of the valves are operatively coupled to one or more of the EOPs. In some embodiments of the device, one or more of the EOPs are operatively coupled to one or more reservoirs comprising fluids. In some other embodiments of the device, the valve is operatively coupled to one or more reagent compartments comprising dried or liquid buffers or reagents, such that, an operation of the valve enables dissolution of the buffers or reagents. The buffer or reagents after dissolution may further flow through downstream components of the device. In one embodiment of the device, the reagent compartments are placed in series with the pumps. In one or more embodiments, the dried buffer or reagents are configured to be rehydrated and reconstituted by the fluid.

FIG. 11 shows an integrated structure of a system 80 comprising three components, power and fluid source 82, high pressure EOP 84 and microfluidic channel 86 comprising a valve. In one or more exemplary embodiments, the integrated system 80 may be a microfluidic device. The power and fluid source 82 comprises stacked disks 96. The disk comprises power source with a switch 90, electrical contacts to the EOP 92 and a fluid reservoir 94. Each of the disks 96, has a diameter of 1 inch. The combined structure of 84 and 86 has magnified to show the EOP 100 with applied voltage 0, and another EOP 104 with applied voltage between 1 to 25 V. The check valve 102 is present downstream of the EOP 100, which is in a closed form. The check valve 106 is present downstream of the EOP 104, wherein the voltage between 1-25 V is applied to increase the fluidic pressure of EOP 104 and the valve 106 is in the open form, which blocks the fluid flow through the microfluidic channel.

The state of the operatively coupled valve may be continuously altered by varying the pressure or flow output of the operably coupled EOP. The valve may be held in a static open or closed state by maintaining a constant set flow or pressure using a voltage or current control circuit. The valve state may also be continuously cycled from the open to closed state by either venting the pressure developed by the EOP, or reversing the EOP flow direction. The valve state may also be set at partially closed positions by controlling the exact pressure output of the EOP with respect to the valve actuation pressure requirements. The high pressure EOP may also be used to increase the valve pressure beyond the minimal valve actuation pressure, and minimizing leak flow to less the 0.1% of the maximum or open forward flow.

The application of a potential across the EOPs enable the valves to actuate, which may results in rehydration and loading of reagents isolated in a storage chamber by each valve. Due to the ability of the EOPs to adjust pumping pressure, the disk may serve as the fluid drive for selective applications and may contain washing buffer, or elution buffer. The operating pressure for a simple check valve is >1 PSI, whereas the pumping pressure generated using a single membrane EOP is about 0.7 PSI as shown in FIG. 3. Thus, the advantage of a multiple membrane stacked EOP is reflected herein, to generate significant amount of pressure, for example >1 PSI that is required for actuation of a simple valve. The actuation of silicone valves, such as valves in Biacore® system, require minimum operating pressure of ~4 PSI, which can be achieved using multiple membrane stacked EOP.

In one or more embodiments, a disposable disk contains EOP's, wherein each of the EOPs is capped with a highly absorbent cellulose membrane. The membranes, for one example, FTA® provide an ability to stabilize buffers and/or enzymatic reagents in the dehydrated form in the disk. In the disk (or cartridge), the cellulose membranes are impregnated with NaCl and different colored food dye. Each disk is fabricated by laminating the EOP stacks, and buffer storage disks into plastic cartridges. Each of the EOPs is also operatively coupled to a check-valve.

The high pressure EOPs may then be used to selectively rehydrate dried reagents or buffer plugs downstream of the pump. Thus, simple running buffers or DI water, may be used to run the pumps, and then rehydrate more complex components downstream. The high pressure output of the EOP stacks, enables rehydration of dense plugs of dehydrated materials, such as the salts associated with standard bioanalytical liquid solutions. The dehydrated plugs may also contain important reagents for bioassays, such as the Ready-to-Go® PCR reagents sold by GE. The elution profile for a specific device using green food dye is presented in FIG. 12. The graph 108 shows that the EOP pumping time, which is required to rehydrate the material reaches a plateau at about 5 seconds.

Figure 12:
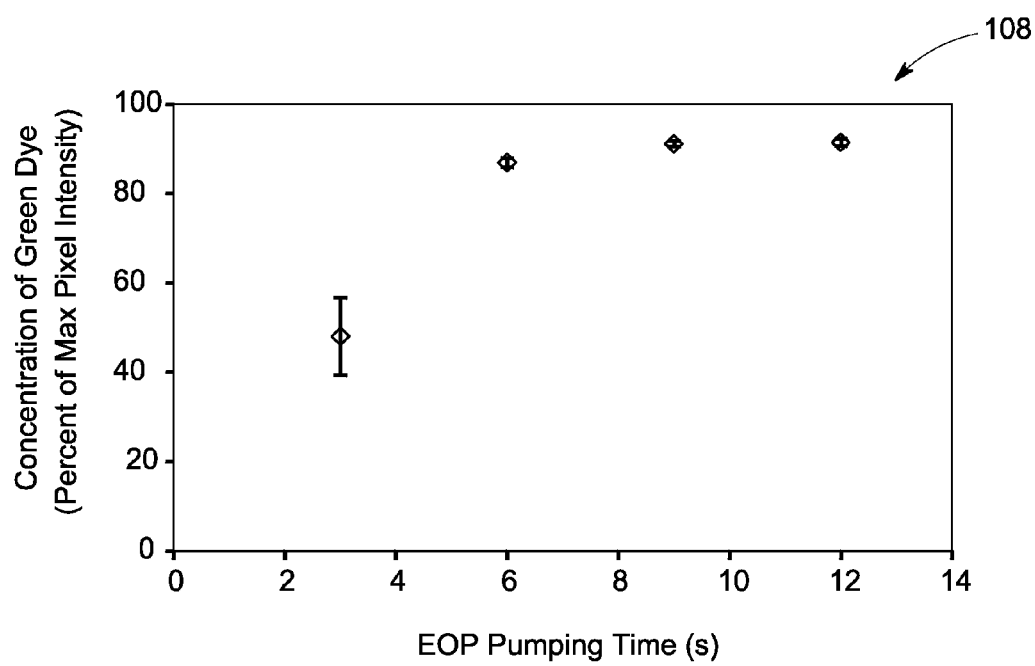
FIG. 12 is a graph showing rehydration time of dry buffer or reagents using EOP-based valves.

Each of the three different EOPs is coupled to the check valve shown in FIG. 10. Each check valve is isolating a different type of dehydrated buffer/reagent (Red, Green, and Blue food dye with NaCl), which is dried into three separate cellulose disks. The EOP that was operatively coupled to the cellulose disk containing green food dye was selected, and 20 volts was applied. Running buffer flowing through the EOP causes actuation of the check valve isolating that storage disk. The running buffer reconstitutes the buffer/reagents stored in that disk. The time required for mixing and exchange of the running buffer with the dried reagents is monitored by imaging the eluted fluid, and measuring the amount of green dye contained within the eluted fluid. The green dye concentration is measured using a standard digital camera by comparing pixel intensities as shown in FIG. 12, and presented as the percent pixel intensity compared to the clear running buffer (0), and the darkest ejected liquid (100).

Example 1

Fabrication of EOPs

For this example, the need for metallization of each electroosmotic membrane in the EOP stack, assembly and handling of the electroosmotic membranes in a disposable cartridge, and manufacturing cost and fragility of the nanoporous membranes, were the primary challenges.

Materials: The Anodisc® membranes are an in-house product (GE Healthcare), which are available in a package of 100 membranes. The silica membranes were created in-house by coating GE's Anodisc® product with $SiO_2$ using either treatment in a sol-gel solution or deposition within an atomic layer deposition chamber. Silica sol gel was produced using raw materials from Sigma Aldrich, including TEOS (Tetraethyl orthosilicate), CAT #86578-250 ml. ALD coating was performed using tris (tert-butoxy) silanol and trimethyl-aluminum as the precursors. Pt, Ag or Au electrodes were purchased from Good-fellow Cambridge Limited. The Anodisc® membranes are used as bare Anodisc® and also after the silica treatment, as shown in FIGS. 2A and 2B. The cellulose or paper sheets were acquired from Whatman™. A Keithley 2400 SourceMeter commercial power source and a disposable paper battery from power paper (supplied in a research agreement) were used as power sources.

EOP assembly was achieved by the method described below. An electrode was made of cellulose or paper, whereby large cellulose sheets (from Whatman™) were stretched within a metal frame, and saturated with a conductive polymer PEDOT:PSS, followed by drying. Alternatively, the electroosmotic membranes may be directly spin coated with PEDOT:PSS solution, followed by drying and etching. In other embodiments, a porous metal mesh was dip coated by PEDOT:PSS solution and dried. After a solvent treatment to render the PEDOT:PSS conductive and a brief drying period, electrodes were cut from the large sheet via laser machining or physical punching, and the paper electrodes were disposed between the alternating nanoporous ceramic membranes, as shown in FIG. 1B. By this method, the metallization of the Anodisc® which was required previously for creating EOPs, was replaced, and the paper electrodes were stacked using automated pick-and-place equipment. In addition, each Anodisc® was cushioned between the cellulose electrode layers, providing a physical robustness to the EOP stack. This alternative arrangement of membranes and electrodes was laminated to form EOPs within plastic cartridges without damage to the fragile, internal ceramic membrane structure. A small 8 mm diameter EOP assembly was used. Each unit structure of EOP was primed with DI water, mounted to a MEMS flow sensor, and a DC voltage was applied across each electroosmotic membrane using the paper electrodes within the stack.

After assembling of the EOPs, the integrated EOP was loaded into a plastic housing, and primed with a fluid, such as DI water or borate buffer. Then the electrical battery terminals are attached to the electrode contacts in the membrane stack/EOP. Each alternating contact was attached to the positive, and then negative terminal on the battery respectively. An exact voltage from the Keithley power supply, or the direct voltage coming from a battery, was applied to the EOP. A MEMS flow sensor was placed in a series with the EOP, and flow rates were measured at the membrane stack exit. A back-pressure (from fluid column) was then applied to examine the maximum pumping pressure of the stack (the pressure at which the pump stalls, is considered the maximum pressure output from the EOP).

The flow rate of the EOP was monitored to check the pump efficiency. A brief burst at flow onset was due to the primed liquid exiting the capillary containing the MEMS sensor, however it quickly reaches a stable flow rate within seconds, as shown in FIG. 4.

Example 2

Determination of Stall Pressure by Increasing Number of Membranes

Experimental results were generated measuring the stall pressure of a single Anodisc® EOP, and a double stack membrane using low-voltage, high pressure EOPs. Flow rates were measured using a commercial MEMS flow sensor as increased back pressure was applied to the pump. There was a 2× increase in pumping pressure within the double stack membrane, when compared to single membrane EOP, as shown in FIG. 3. The pumping pressures could be tuned to application-specific values based on the intelligent assembly scheme, as shown in FIG. 1B. The flow rates were measured using a commercial MEMS flow sensor, Sensirion CMOSENS LG16-1000D, after the increased pressure load was applied to the pump. The pumping pressure may be increased or decreased according to the pressure requirement for specific applications by increasing or decreasing the number of membranes in the EOP.

Example 3

EOP Operation Using Various Electrode Materials

Most electroosmotic pumps work by passing hydrolyzed ions at the surface of the metal electrodes, thus releasing hydrogen and oxygen gas at the opposite ends of the nanopores of the membranes as described in FIG. 5A-5C. In three different EOPs, three different electrodes were selected. In the first example, a Pt electrode was used where a standard hydrolysis reaction took place using a standard hydrolysis driven pump. The flow rate is comparatively less in case of this EOP with Pt electrodes. The advantage of this EOP is the use of an inert electrode and standard pump configuration. Still, gas accumulation even at low driving voltages induces bubble formation and pH fluctuation, which is an increased burden in the dense nanoporous stacks, as shown in FIG. 5A. In the second example, silver oxide was used as the metal oxide electrode, as shown in FIG. 5B, where the redox reactions took place on the electrode surface which minimized the bubble formation and reduced the over potential. However, the disadvantages of this type of electrodes are limited coulombic capacity and the possibility of silver build up at the electrodes which may cause silver leaching to the electrolyte solution. In the third example, the conductive or redox polymer PEDOT/PSS was used as the electrodes. The PEDOT/PSS electrode had the same advantages of minimizing bubble formation without large over potentials due to hydrolysis. Instead, internal redox within the conductive polymer (PEDOT/PSS) coated paper electrodes provided an internal driving mechanism to drive ions and generate the current necessary to run the EOP, as shown in FIG. 5C. The voltage, which was applied on the PEDOT/PSS electrode, resulted in a redox reaction within the bulk of the material thus use of the high capacity cellulose as the electrode support substrate enabled increased coulombic capacity for driving the pump over longer periods of time.

Example 4

Determination of Pumping Rate Using Various Electrode Materials in the EOP Stack Maximum flow rate of an EOP assembly using platinum mesh electrodes (0.06" diameter wires) between nanoporous AAO membranes (20 nm pore size) was determined (FIG. 6A), using the flow sensor described in Example 2. Maximum flow rate of an EOP assembly using Pedot:PSS saturated cellulose paper electrodes (0.5 mm paper thickness) between nanoporous AAO membranes (20 nm pore size) was determined The increased pumping efficiency is due to both increased uniformity of the electric field (vs. the 0.06" mesh) and elimination of the over-potential required when using platinum (FIG. 6B). The flow rates were measured with no applied back pressure and thus represent the no load or maximum flow output for the EOP stack.

Example 5

Determination of Operating Pressure Range for Actuation of Valves

A flow sensor was placed in a series connection with the check valve, and the flow was measured after applying the pressure in the forward and reverse directions, or in the closing or opening direction of the valve respectively. The key parameters measured including leak flow, where the flow rate was measured in the closed direction and forward flow rate was measured in the opened direction.

FIG. 10 graphically represents 78 efficiency of a check valve 77 using a pressure driven pump known in the art to determine operating pressure range for the check valve. The efficiency was derived from the flow ratio of leak flow and the forward flow. FIG. 10 illustrates a graph showing requirement of operating pressure for a simple check valve, which is >1 PSI, while the pumping pressure of a single membrane EOP was measured about 0.7 PSI as shown in FIG. 3. However, the EOP with double stacked membrane generated pressure greater than 1 PSI, as shown in FIG. 3.

FIG. 10 shows the pressure requirement for actuating a check valve made from 0.5 mil kapton sheet. The size of the pore that the check valve sealed against was 400 µm in diameter, and centered at the semi-circular end of the flap. The check valve flap is with 2 mm of arm length and diameter of 0.5 mm The graph shows the flow rate ratio for pushing fluid through the check valve in the opened (F—forward) vs. closed (B—Backward or leak) direction. The operating range was deemed to be the point where the leak flow rate (B) was less that 0.1% of the forward flow. Again, this operating pressure range is greater than the pressure output of standard low-voltage EOP.

The actuation of silicone valves (Biacore® system, alternate designs used by Fluidigm®) were also tested and found minimum operating pressure of ~4 PSI as shown in FIG. 8. Thus, this further demonstrated the broad applicability of removing complex pressure and power sources from fluidic systems via high pressure EOP actuation.

As an example, FIG. 8 shows the pressure requirement for actuating a version of the elastomeric microfluidic valve contained within GE's Biacore™ system with SPR based technology. A pressure was applied to the channel, and flow rate was measured with the valve open, and then after pressurizing the chamber behind the valve. As the valve closes and fluidic resistance increases, the flow rate through the channel drops. The valve shows full closure at 4 PSI, showing that actuation is not possible with standard low-voltage EOPs. In this example, the valve actuation fluid is separated from the fluid in the channel by the elastomeric valve.

While only certain features of the invention have been illustrated and described herein, many modifications and changes will occur to those skilled in the art. It is, therefore, to be understood that the appended claims are intended to cover all such modifications and changes as fall within the scope of the invention.

What is claimed is:

1. A method of actuating a valve, comprising:
operatively coupling the valve with an electroosmotic pump;
flowing a fluid through the electroosmotic pump; and
generating a fluidic pressure of at least 0.75 PSI to actuate the valve,
wherein the electroosmotic pump comprises one or more thin, porous, positive electroosmotic membranes and one or more thin porous, negative electroosmotic membranes; a plurality of electrodes comprising cathodes and anodes, and a power source; wherein each of the positive and negative electroosmotic membranes are disposed alternatively and wherein at least one of the cathodes is disposed on one side of one of the membranes and at least one of the anodes is disposed on other side of the membrane and wherein at least one of the cathodes or anodes is disposed between a positive and a negative electroosmotic membrane.

2. The method of claim 1, wherein the fluidic pressure is about 0.75 to 30 PSI to actuate the valve.

3. The method of claim 1, wherein the fluidic pressure is about 30 to 100 PSI to actuate the valve.

4. The method of claim 3, wherein the application achieves an electric field greater than 100 V/m across each electroosmotic membrane within the pump.

5. The method of claim 1, wherein the fluidic pressure is generated by operating the electroosmotic pump by applying less than 25 volts across each of the membranes.

6. The method of claim 1, wherein the fluidic pressure is generated by using an electroosmotic pump comprising about 2 to 100 membranes.

7. The method of claim 1, wherein the fluid flows through the electroosmotic pump comprising nanoporous membranes.

8. The method of claim 1, wherein the fluid flows through the electroosmotic pump with a flow rate of about 0.1 uL/min to 10 mL/min per $cm^2$ of surface area across the membranes.

9. The method of claim 1, wherein the fluid flows through the membranes having a thickness of about 10 nm to 10 mm for each individual membrane component.

10. The method of claim 1, wherein the membranes comprise tungsten oxide, vanadium oxide, silicon dioxide/silica, common glasses/silicates, silicon carbide, tantalum oxide, halfnium oxide, tin oxide, manganese oxide, titanium oxide, silicon nitride, chromium oxide, aluminum oxide/alumina, zinc oxide, nickel oxide, and magnesium oxide; or, polymers with grafted or coated ionizable functionalities to achieve zeta potential similar to said dielectrics, and combinations thereof.

11. The method of claim 1, wherein the positive electroosmotic membranes comprise silica or silicate materials and the negative electroosmotic membranes comprise alumina materials.

12. The method of claim 1, wherein the membranes comprise polymers, selected from PDMS, COC, PMMA, PC and combinations thereof.

13. The method of claim 1, wherein the electrodes comprise a macroporous metal, conductive polymer, redox polymer, redox metal salt, metal oxide and combinations thereof.

14. The method of claim 1, wherein the fluid flows through the electroosmotic pump in a transverse direction.

15. The method of claim 1, wherein the electroosmotic pump is further operatively coupled to at least one reservoir comprising the fluid.

16. The method of claim 1, wherein a voltage or current controller controls or varies or holds the fluid flow or pressure output from the EOP.

17. The method of claim 16, wherein using the fluid flow or pressure output of the EOP statically or dynamically varies the state of the operatiely coupled valve.

18. The method of claim 16, where the fluid flow or pressure output of the EOP is utilized to control a leak flow across the valve to less than 0.1% of the maximum (forward, open valve) flow.

* * * * *